US011477233B2

(12) United States Patent
Thomas et al.

(10) Patent No.: US 11,477,233 B2
(45) Date of Patent: Oct. 18, 2022

(54) DEPLOYING SECURE NEIGHBOR DISCOVERY IN EVPN

(71) Applicant: Juniper Networks, Inc., Sunnyvale, CA (US)

(72) Inventors: Reji Thomas, Bangalore (IN); SelvaKumar Sivaraj, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/860,828

(22) Filed: Apr. 28, 2020

(65) Prior Publication Data

US 2021/0119828 A1 Apr. 22, 2021

Related U.S. Application Data

(60) Provisional application No. 62/923,070, filed on Oct. 18, 2019.

(51) Int. Cl.
| | |
|---|---|
| H04L 9/40 | (2022.01) |
| H04L 12/46 | (2006.01) |
| H04L 12/66 | (2006.01) |
| H04L 41/12 | (2022.01) |
| H04L 45/64 | (2022.01) |
| H04L 101/622 | (2022.01) |
| H04L 45/00 | (2022.01) |
| H04L 45/24 | (2022.01) |

(52) U.S. Cl.
CPC ...... *H04L 63/1466* (2013.01); *H04L 12/4641* (2013.01); *H04L 12/66* (2013.01); *H04L 41/12* (2013.01); *H04L 45/24* (2013.01); *H04L 45/26* (2013.01); *H04L 45/64* (2013.01); *H04L 45/66* (2013.01); *H04L 61/6022* (2013.01); *H04L 63/0272* (2013.01)

(58) Field of Classification Search
None
See application file for complete search history.

(56) References Cited

U.S. PATENT DOCUMENTS

| 9,860,169 B1* | 1/2018 | Ninan ............... H04L 45/02 |
| 10,033,636 B1* | 7/2018 | Zhang ............. H04L 12/4633 |
| 10,383,027 B1* | 8/2019 | Sivaraj ............. H04L 67/28 |

(Continued)

FOREIGN PATENT DOCUMENTS

WO  WO 2020/163210 A1 * 8/2020

OTHER PUBLICATIONS

J. Arkko, Ed., J. Kempf, B. Zill and P. Nikander, SEcure Neighbor Discovery (SEND), pp. 1-56, Mar. 2005.*

(Continued)

*Primary Examiner* — Christopher M Crutchfield
(74) *Attorney, Agent, or Firm* — Shumaker & Sieffert, P.A.

(57) ABSTRACT

Techniques are described for providing security extensions to neighbor discovery in Ethernet Virtual Private Network (EVPN). For example, a network device that implements Ethernet Virtual Private Network (EVPN) receives a neighbor discovery response message including a nonce originated by a second network device and not originated by the first network device. The network device processes the neighbor discovery response message including the nonce originated by the second network device and not originated by the first network device.

13 Claims, 8 Drawing Sheets

(56) References Cited

U.S. PATENT DOCUMENTS

| | | | | |
|---|---|---|---|---|
| 2013/0291117 | A1* | 10/2013 | Thubert | H04L 45/742 726/26 |
| 2014/0282864 | A1* | 9/2014 | Thubert | H04L 63/1458 726/3 |
| 2016/0191374 | A1* | 6/2016 | Singh | H04L 45/28 370/228 |
| 2017/0195210 | A1* | 7/2017 | Jacob | H04L 45/66 |

OTHER PUBLICATIONS

Author Unknown, MPLS Layer 2 VPNs Configuration Guide, Cisco IOS XE Gibraltar 16.10.x, pp. 1-742, Dec. 2018.*

T. Narten, W. Simpson, H. Soliman, Neighbor Discovery for IP version 6 (IPv6), pp. 1-97, Sep. 2007.*

A. Sajassi, J. Uttaro, N. Bitar, W. Henderickx, A. Isaac, Requirements for Ethernet VPN (EVPN), pp. 1-15, May 2014.*

T. Narten, M. Karlr and I. Foo, Address Resolution Problems in Large Data Center Networks, pp. 1-17, Jan. 2013.*

A. Sajassi, Ed., N. Bitar, A. Isaac, J. Uttaro, J. Drake, BGP MPLS-Based Ethernet VPN, Feb. 2015.*

Extended Search Report from counterpart European Application No. 20186479.0, dated Oct. 8, 2020, 14 pp.

Rabadan et al., "Operational Aspects of Proxy-ARP/ND in EVPN Networks draft-ietf-bess-evpn-proxy-arp-nd-00," BESS Workgroup Internet Draft, Oct. 6, 2015, 22 pp.

Patel et al., "Virtual Hub-and-Spoke in BGP EVPNs draft-ietf-bess-evpn-virtual-hub-00," BESS Workgroup Internet Draft, Sep. 28, 2019, 17 pp.

"Example: Configuring an EVPN-VXLAN Edge-Routed Bridging Overlay Within a Data Center," Juniper Networks, Retrieved Sep. 29, 2020 from: https://www.juniper.neUdocumentation/en_US/junos/topics/example/evpn-vxlan-collapsed-topology.html, Apr. 10, 2019, 13 pp.

Rabadan et al., "Operational Aspects of Proxy-ARP/ND in EVPN Networks," draft-ietf-bess-evpn-proxy-arp-nd-00, BESS Workgroup Internet Draft, Internet Engineering Task Force, Nov. 5, 2018, 23 pp.

Narten et al., "Neighbor Discovery for IP version 6 (IPv6)," Network Working Group, Request for Comments: 4861, Sep. 2007, 97 pp.

Arkko, Ed., et al. "SEcure Neighbor Discovery (SEND)," Network Working Group, Request for Comments: 3971, Mar. 2005, 56 pp.

Response to Extended Search Report dated Oct. 8, 2020, from counterpart European Application No. 20186479.0, filed Oct. 21, 2021, 31 pp.

Rabadan et al., "Operational Aspects of Proxy-ARP/ND in EVPN Networks," draft-ietf-bess-evpn-proxy-arp-nd-02, BESS Workgroup Internet Draft, Apr. 6, 2017, 22 pp.

Communication pursuant to Article 94(3) EPC from counterpart European Application No. 20186479.0 dated Aug. 10, 2022, 8 pp.

* cited by examiner

DEPLOYING SECURE NEIGHBOR DISCOVERY IN EVPN

This application claims the benefit of U.S. Provisional Patent Application No. 62/923,070 filed on Oct. 18, 2019, which is hereby incorporated by reference herein in its entirety.

TECHNICAL FIELD

The disclosure relates to computer networks and, more particularly, to forwarding traffic within computer networks.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Common L3 operations include those performed in accordance with L3 protocols, such as the Internet protocol ("IP"). Network devices within computer networks often include a control unit that provides control plane functionality for the network device and forwarding units for routing or switching data units.

In an L3 network, network devices may use a Neighbor Discovery Protocol (NDP) to discover the presence of other network devices and link layer addresses, and to maintain reachability information about paths to active neighbors. For example, devices that implement NDP send or receive five types of neighbor discovery messages: router solicitation (RS), router advertisement (RA), neighbor solicitation (NS), neighbor advertisement (NA), and redirect. In some examples, NDP may be extended to include security extensions, such as SEcure Neighbor Discovery (SEND). SEND provides cryptographic mechanisms for network devices to secure delivery and authentication of neighbor discovery messages. As one example, a sender device originates a nonce, stores the nonce, and sends a neighbor discovery request message, e.g., neighbor solicitation message, including the nonce to prevent replay attacks. If the sender device receives a neighbor discovery response message, e.g., neighbor advertisement message, including the nonce that matches the nonce stored by the sender device, the sender device determines that the neighbor discovery response message is not a replay attack and learns the link layer addresses. If the neighbor discovery response message does not include a nonce that matches the nonce stored by the sender device, the sender device drops the neighbor discovery response message.

SUMMARY

In general, techniques are described for providing security extensions to neighbor discovery in Ethernet Virtual Private Network (EVPN). For example, network devices send and receive neighbor discovery message, e.g., using Neighbor Discovery Protocol (NDP), to discover the presence of neighboring devices and link layer addresses, and to maintain reachability information about the paths to active neighbors. In some examples, NDP is extended to include security extensions, such as SEcure Neighbor Discovery (SEND). Using SEND, network devices generate neighbor discovery messages that carry public key-based signatures for securing and authenticating the neighbor discovery messages. For example, network devices include a nonce in neighbor discovery messages to prevent replay attacks. In the examples described herein, network devices are configured to process a received neighbor discovery response message even though the receiving network device did not originate the nonce.

In one example in which a host device is multi-homed to a plurality of network devices, e.g., Provider Edge (PE) devices, of an Ethernet segment in a collapsed IP fabric, the host device may, in response to receiving a neighbor discovery request message, e.g., neighbor solicitation message, including a nonce from a first PE device, send a neighbor advertisement message including the nonce to a second PE device of the Ethernet segment. That is, the first PE device may send the neighbor solicitation message with a nonce, but the second PE device receives the neighbor advertisement message with the nonce originated by the first PE device. Rather than dropping the neighbor advertisement message because the second PE device is unable to validate the nonce in the neighbor advertisement message due to the second PE device not having originated the nonce, the second PE device may be configured to relax the nonce validation requirement for neighbor discovery messages arriving on an Ethernet Segment Identifier (ESI) interface for the first and second PE devices coupled to the multi-homed host device. For example, the first PE device and second PE device may each be configured to determine whether a neighbor advertisement message arrives on the ESI interface connected to the host, and if so, the PE device may drop the nonce from the neighbor advertisement message even if the receiving PE device did not originate the nonce.

In another example in which a host device is multi-homed to a plurality of PE devices in a non-collapsed IP fabric, the sender device may send a neighbor discovery request message, e.g., neighbor solicitation message, including a nonce, where the source address of the neighbor solicitation message specifies a physical IP address of the sender device rather than the virtual (or anycast) IP address of an Integrated Routing and Bridging (IRB) interface to cause the neighbor advertisement message to be forwarded to the sender device that originated the neighbor solicitation message including the nonce.

In another example in which network devices may operate as a proxy for neighbor discovery (referred to herein as "EVPN-proxy"), as described in J. Rabadan, ed., et al., "Operational Aspects of Proxy-ARP/ND in EVPN Networks," draft-ietf-bess-evpn-proxy-arp-nd-05, Internet Draft, Nov. 5, 2018, the entire contents of which is incorporated by reference herein. In this example, PE devices may intercept (i.e., "snooping") a first neighbor discovery response message, e.g., first neighbor advertisement message, including a nonce, that is sent from a local host device to a remote host device in response to a first neighbor discovery request message, e.g., neighbor solicitation message, from the remote host device. In response to determining that the PE device did not originate the nonce of the first neighbor advertisement message, the PE device drops the first neighbor advertisement message and sends a second neighbor solicitation message including the nonce to the local host device. The PE device may receive a second neighbor advertisement message including the nonce, store the learned link layer addresses, and advertise the learned addresses to remote PE devices over the EVPN core. In this way, PE devices may act as a proxy by using the learned addresses to reply to neighbor discovery request message of local host devices rather than sending the neighbor discovery request message over the EVPN core.

In one example, a method includes receiving, by a first network device that implements Ethernet Virtual Private Network (EVPN), a neighbor discovery response message including a nonce originated by a second network device and not originated by the first network device. The method also includes processing, by the first network device, the neighbor discovery response message including the nonce originated by the second network device and not originated by the first network device.

In another example, a first network device that implements Ethernet Virtual Private Network (EVPN), comprising: one or more processors coupled to a memory, wherein the one or more processors are configured to: receive a neighbor discovery response message including a nonce originated by a second network device and not originated by the first network device; and process the neighbor discovery response message including the nonce originated by the second network device and not originated by the first network device.

In yet another example, a non-transitory computer-readable storage medium comprising instructions for causing one or more programmable processors of a network device to: receive a neighbor discovery response message including a nonce originated by a second network device and not originated by the first network device; and process the neighbor discovery response message including the nonce originated by the second network device and not originated by the first network device.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
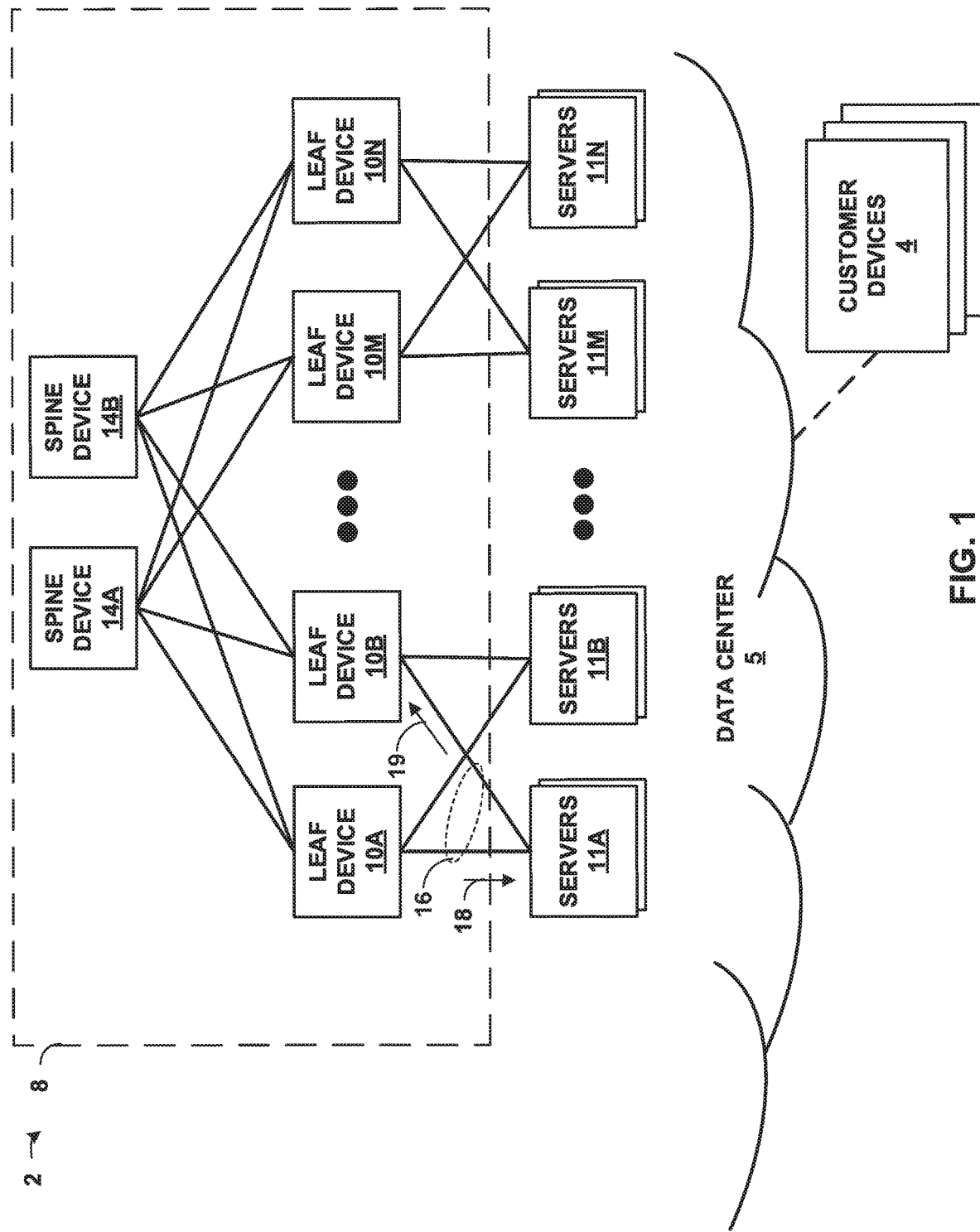
FIG. 1 is a block diagram illustrating an example network system configured to provide security extensions, e.g., SEcure Neighbor Discovery (SEND), to neighbor discovery in EVPN for a collapsed IP fabric, in accordance with one or more aspects of the techniques described in this disclosure.

FIG. 1 is a block diagram illustrating a network system 2 configured to provide security extensions, e.g., Secure Neighbor Discovery (SEND), to neighbor discovery in EVPN in a collapsed IP fabric, in accordance with one or more aspects of the techniques described in this disclosure. FIG. 1 illustrates an example network system 2 including a data center 5 connected to customer devices 4. Data center 5 may, for example, host infrastructure equipment, such as networking and storage systems, redundant power supplies, and environmental controls. In general, data center 5 provides an operating environment for applications and services for customer devices 4 coupled to the data center, e.g., by a service provider network (not shown). In some examples, a service provider network that couples customer devices 4 to data center 5 may be coupled to one or more networks administered by other providers, and may thus form part of a large-scale public network infrastructure, e.g., the Internet.

In some examples, data center 5 represents one of many geographically distributed network data centers. As illustrated in the example of FIG. 1, data center 5 may be a facility that provides network services for customers through customer devices 4. Customer devices 120 may include the devices of entities (such as enterprises and governments) and of individuals. For example, a network data center may host web services for both enterprises and end users. Other example services may include data storage, virtual private networks, traffic engineering, file service, data mining, scientific- or super-computing, and so on. In some examples, data center 5 may be individual network servers, network peers, or otherwise. In some examples, data center 5 is an enterprise or internal data center.

Data center 5 may include one or more interconnected servers, e.g., servers 11A-11N (collectively, "servers 11") that each provides execution and storage environments for applications and data associated with customers via customer devices 4 and may be physical servers, virtual machines, or combinations thereof. Servers 11 are interconnected via an Internet Protocol (IP) fabric 8, which may comprise a fabric provided by one or more tiers of physical network devices, such as, for example, routers, gateways, switches, hubs, modems, bridges, repeaters, multiplexers, servers, virtual machines running on one or more of the same, and other example network devices. Servers 11 may be referred to herein as "hosts."

IP fabric 8 may provide servers 11 with redundant (multi-homed) connectivity to the IP fabric and service provider network. In this example, IP fabric 8 represents layer two (L2) and layer three (L3) switching and routing components that provide point-to-point connectivity between servers 11. In one example, IP fabric 8 comprises a set of interconnected, packet-based routers and switches that implement various protocols. In one example, IP fabric 8 may comprise devices that provide IP point-to-point connectivity. In some multi-staged networks such as IP fabric 8, each switch resides in a defined layer of the network, referred to as a CLOS topology or a spine and leaf network. As shown in the example of FIG. 1, spine devices 14A and 14B (collectively, "spine devices 14") reside in a first, top layer and leaf devices 10A-10N (collectively, "leaf devices 10") reside in a second layer. Leaf devices 10 may be network devices (e.g., Top-of-Rack (TOR) switches) that provide layer 2 (e.g., MAC) and/or layer 3 (e.g., IP) routing and/or switching functionality. Spine devices 14 aggregate traffic flows and provides high-speed connectivity between leaf devices 10. In some examples, data center 5 may deploy EVPN-VXLAN over a physical underlay network in which IP fabric 8 is collapsed into a single layer of leaf devices 10 (referred to herein as "collapsed IP fabric"). In a collapsed IP fabric, leaf devices 10 serve as both Layer 2 and Layer 3 gateways. Spine devices 14 of the collapsed IP fabric provide only Layer 3 routing functionality. Spine devices 14 and leaf devices 10 may each include one or more processors and a memory, and that are capable of executing one or more software processes. As shown in the example of FIG. 1, each of spine devices 14 is communicatively coupled to each of leaf devices 10A-10N, and servers 11 are directly connected to leaf devices 10 that operate as both L2 and L3 gateways, and is thus arranged as a collapsed IP fabric. The configuration of network system 2 illustrated in FIG. 1 is merely an example. For example, data center 5 may include any number of spine and leaf devices, and IP fabric 8 may be arranged as a non-collapsed IP fabric (as further described below in the example of FIG. 3).

Spine devices 14 and leaf devices 10 may each participate in an L2 virtual private network ("L2VPN") service, such as an Ethernet Virtual Private Network (EVPN). An EVPN is a service that provides a form of L2 connectivity across an intermediate L3 network, such as a service provider network, to interconnect two or more L2 networks that may be located in different racks of data center 5. Often, EVPN is transparent to the customer networks in that these customer networks are not aware of the intervening intermediate network and instead act and operate as if these customer networks were directly connected and form a single L2 network. In a way, EVPN enables a form of transparent local area network ("LAN") connection between two customer networks (e.g., different racks of data center 5) that each operates an L2 network and may also be referred to as a "transparent LAN service."

To provide flexibility and scalability, multiple bridge domains can be defined for a particular EVPN instance (EVI). One or more EVIs can be associated with a single L3 VPN virtual routing and forwarding instance (VRF). For example, each data center tenant may be assigned a unique VRF; a tenant can encompass one or more EVPN instances and one or more bridge domains (e.g., VLANs or VXLANs) per EVPN instance. Spine devices 14 and leaf devices 10 may be included in one or more virtual LANs (VLANs), which are groups of devices on one or more LANs that are configured to communicate as if they are attached to the same wire.

As shown in FIG. 1, each of servers 11 is multi-homed to leaf devices 10 by Ethernet segments for redundancy, load balancing, or both. As one example, server 11A is multi-homed to leaf devices 10A and 10B by Ethernet segment 16. Ports of leaf devices 10A and 10B (e.g., TOR switches) are configured as logically bundled Ethernet segment 16 such that leaf devices 10A and 10B operate to provide either single-active or active-active multi-homed L2 connectivity to server 11A of data center 5.

To enable leaf devices 10A and 10B connected to the same Ethernet segment 16 to automatically discover one another, each of leaf devices 10A and 10B advertises an Ethernet segment route (Type 4), which is typically unique across all EVPN instances (EVIs), for each of the Ethernet segments multi-homed by the leaf device. For example, each of leaf devices 10A and 10B use Border Gateway Protocol (BGP) to advertise an Ethernet segment route that includes a Route Distinguisher (RD), ESI, and an originating network device's network address (e.g., IP address).

In addition, for each EVI, the EVPN protocol directs the router to output a routing protocol message advertising an Ethernet Auto-Discovery (AD) route (Type 1) specifying the relevant ESI for the Ethernet segment coupled to the EVPN instance. That is, each of leaf devices 10A and 10B may advertise an Ethernet AD route per Ethernet segment to advertise reachability of the leaf device for the Ethernet segment. For example, each of leaf devices 10A and 10B, for each EVI, use BGP to advertise an Ethernet AD route that includes an RD (which may include, e.g., an IP address of the originating PE device), ESI, Ethernet Tag Identifier, and VNI. Each of the routes are advertised and imported by all multi-homed leaf devices that share the same EVI on the advertising ESI. In the example of FIG. 1, each of leaf devices 10A and 10B of the EVPN instance advertise and import the routes described above to discover each other for Ethernet segment 16.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network system 2 illustrated in FIG. 1 is merely an example.

In some examples, network devices may implement neighbor discovery protocols to discover neighboring devices. For example, hosts, such as servers 11 may implement Neighbor Discovery Protocol (NDP) to send and receive neighbor discovery messages to find neighboring devices, such as leaf devices 10, that may forward packets on their behalf. Network devices use NDP to determine the link layer addresses for neighbors known to reside on attached links. Network devices that use NDP may maintain reachability information about the paths to active neighbors, such as by actively keeping track of which neighbors are reachable and which are not, and to detect changes in link layer addresses.

NDP defines five different Neighbor Discovery messages. For example, NDP defines Internet Control Message Protocol (ICMP) messages including, for example, router solicitation (RS) messages, router advertisement (RA) messages, neighbor solicitation (NS) messages, neighbor advertisement (NA) messages, and redirect messages.

When an interface of a host becomes enabled, the host may send a router solicitation message that requests routers to generate router advertisements. Routers may send router advertisement messages to advertise their presence and with various links and Internet parameters. Router advertisement messages contain prefixes that are used for determining whether another address shares the same link and/or address configuration, a suggested hop limit value, etc.

A network device may send a neighbor discovery request message, e.g., neighbor solicitation message, to request the link layer address of a neighbor and may also provide its own link layer address to the target network device. Network devices may also use the neighbor solicitation message to verify that a neighbor is still reachable via a cached link layer address. The link layer address may be a link layer identifier for an interface to a link (e.g., IEEE 802 addresses for Ethernet links).

In response to receiving a neighbor solicitation message, a network device may send a neighbor discovery response message, e.g., neighbor advertisement message. The neighbor advertisement message may include, for example, a link layer address that the network device (e.g., endpoint 4) has learned. In some examples, a network device may send a neighbor advertisement message to announce a change in a link layer address. Routers may send a redirect message to inform hosts to redirect traffic to the destination (e.g., to a different next hop).

An NDP message may include an NDP message header (e.g., ICMPv6 header and neighbor discovery message-specific data) and zero or more NDP options (e.g., Source Link Layer Address, Target Link Layer Address, Prefix Information, Redirected Header, and Maximum Transmission Unit (MTU)) included in the Type-Length-Value (TLV) of the NDP message. Additional examples of NDP message are described in T. Narten, et al., "Neighbor Discovery for IP version 6 (IPv6)," Request for Comments (RFC) 4861, September 2007, the entire contents of which is incorporated by reference herein.

In some examples, NDP may be extended with security extensions, such as SEcure Neighbor Discovery (SEND). For example, network devices may use SEND to establish certification paths, use Cryptographically Generated Addresses (CGA), use public key signatures (e.g., Rivest-Shamir-Adleman (RSA) signatures), and/or use a timestamp and/or nonce as an NDP option. In the examples described herein, network devices of network system 2 may use nonce as an NDP option.

Network devices may use a nonce as an NDP option for the NDP message to prevent replay attacks. A nonce is an unpredictable random or pseudo-random number generated by a device and used exactly once. The nonce is used to assure that a particular advertisement is linked to the solicitation that triggered it. For example, a sender device may send a neighbor solicitation message including a nonce and stores the nonce such that the sender device can recognize any responses (e.g., neighbor advertisement messages) containing the nonce. The target network device receives the neighbor solicitation message including the nonce, and in response, sends a neighbor advertisement message including the nonce copied from the neighbor solicitation message. By including the nonce in the neighbor advertisement message, the sender device determines whether the neighbor advertisement message is a fresh response to the neighbor solicitation message sent earlier by the sender device. For example, the sender device may compare the stored nonce and the nonce included in the neighbor advertisement message. If the nonce is the same, the sender device determines that the neighbor advertisement message is the response to the neighbor solicitation message that was sent earlier by the sender device. If the nonce of the neighbor solicitation message does not match the nonce stored in the receiver device, the receiver device discards the neighbor solicitation message. Additional examples of SEND are described in J. Arkko, Ed., et al., "SEcure Neighbor Discovery (SEND)," Request for Comments (RFC) 3971, March 2005, the entire contents of which is incorporated by reference herein.

In some examples, the network devices that exchange neighbor discovery messages may be multi-homed in a collapsed IP fabric as described above. For example, a host, such as server 11A, may be directly connected and multi-homed to leaf devices 10A and 10B. In these examples, the sender device, e.g., leaf device 10A, may send a neighbor solicitation message including a nonce to server 11A. Server 11A may in some instances send a neighbor advertisement message with the nonce originated by leaf device 10A to leaf device 10B instead. That is, in the case of network devices configured in a multi-homed Ethernet segment, there may in some instances be an asymmetric request and response path where the sender device of the Ethernet segment sends the Neighbor Solicitation message including a nonce and the other network device of the Ethernet segment receives a Neighbor Advertisement message including the nonce originated by the sender device. For example, server 11A may load-balance the neighbor advertisement message on any of the links to leaf devices 10A and 10B. Ordinarily, without the techniques of this disclosure, a receiving leaf device that receives a neighbor advertisement message including a nonce that was not originated by the receiving leaf device would discard the neighbor advertisement message (and therefore not learn the link layer addresses of the target host).

In accordance with the techniques of this disclosure, the devices of network system 2 may provide security extensions, e.g., SEND, to neighbor discovery in EVPN. As described above, devices of network system 2 are arranged in a collapsed IP fabric. For example, servers 11 are directly connected and multi-homed to leaf devices 10 (e.g., TOR switches) that operate as L2 and L3 gateways. In a collapsed IP fabric, a receiving device, e.g., leaf device 10B, that receives a neighbor advertisement message including a nonce originated by another device, e.g., leaf device 10A, belonging to the same ESI, may be configured to relax the nonce validation requirement, i.e., that the nonce included in a received neighbor advertisement message must match the nonce stored in the receiving device.

In the example of FIG. 1, leaf devices 10A and 10B belong to the same ESI of Ethernet segment 16. In this example, leaf device 10A may send a neighbor solicitation message 18 including a nonce on a link directly attached to leaf device 10A and server 11A. Server 11A responds to the neighbor solicitation message 18 with a neighbor advertisement message 19 including the nonce from neighbor solicitation message 18. Server 11A may load balance the neighbor advertisement message 19 on the links of Ethernet segment 16, and in some instances, send neighbor advertisement message 19 to leaf device 10B.

In response to receiving neighbor advertisement message 19 including the nonce originated by leaf device 10A, leaf device 10B determines that leaf device 10B did not originate the nonce. For example, leaf device 10B may determine that the nonce included in the neighbor advertisement message 19 does not match a nonce stored in leaf device 10B because leaf device 10B did not originate the nonce. Rather than drop neighbor advertisement message 19, leaf device 10B is configured to relax the requirement that the nonce included in neighbor advertisement message 19 must match the nonce stored in leaf device 10B. For example, leaf device 10B is configured to determine whether a neighbor advertisement message 19 arrives on the ESI interface connected to server 11A, and if so, leaf device 10B may drop the nonce from neighbor advertisement message 19 even though leaf device 10B did not originate the nonce. In the example of FIG. 1, leaf device 10B may determine that neighbor advertisement message 19 is received on the ESI interface connected to server 11A. In response, leaf device 10B may drop the nonce and learn the link layer address of server 11A included in neighbor advertisement message 19.

In some examples, leaf device 10B may include an option to be configured to relax the nonce validation requirement through a management interface (e.g., command-line interface (CLI)). In some examples, the configuration to relax the nonce validation requirement may be "switched off" via configuration changes through the management interface.

Figure 2:
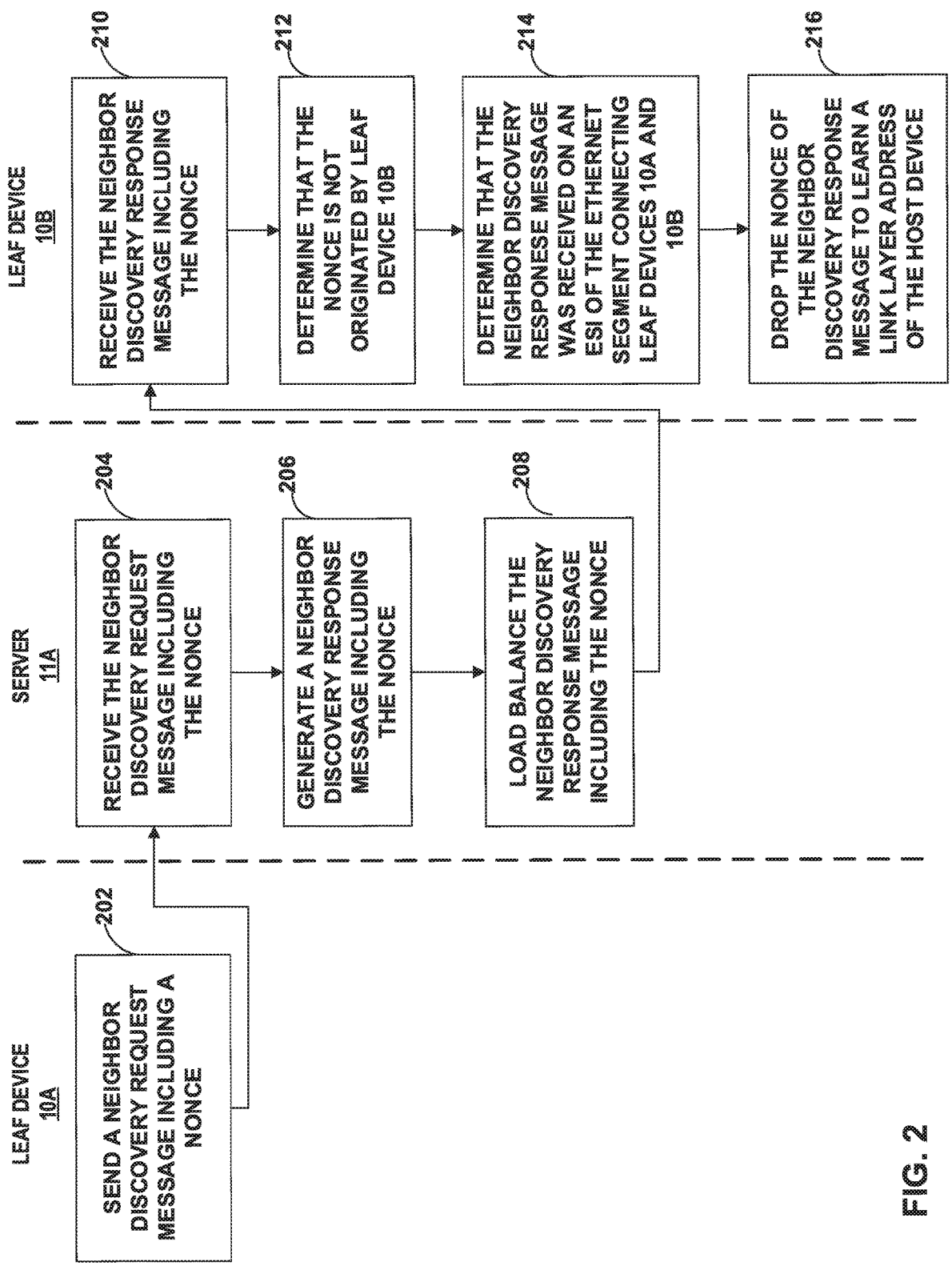
FIG. 2 is a flowchart illustrating an example operation of the network system in FIG. 1 configured to provide security extensions, e.g., SEND, to neighbor discovery in EVPN for a collapsed IP fabric, in accordance with one or more aspects of the techniques described in this disclosure.

FIG. 2 is a flowchart illustrating an example operation of the network system 2 in FIG. 1 configured to provide security extensions, e.g., SEND, to neighbor discovery in EVPN for a collapsed IP fabric, in accordance with one or more aspects of the techniques described in this disclosure. As described above, devices of network system 2 are arranged in a collapsed IP fabric where leaf devices 10 serve as both Layer 2 and Layer 3 gateways, and spine devices 14 provide only Layer 3 routing functionality.

In the example of FIG. 2, leaf device 10A sends a neighbor discovery request message, e.g., neighbor solicitation message 18, including a nonce originated by leaf device 10A (202). Server 11A receives neighbor solicitation message 18 (204) and generates a neighbor discovery response message, e.g., neighbor advertisement message 19, including the nonce originated by leaf device 10A (206). For example, in response to receiving neighbor solicitation message 18, server 11A generates a neighbor advertisement message 19 including the nonce copied from neighbor solicitation message 18.

Server 11A sends the neighbor discovery response message, e.g., neighbor advertisement message 19, including the nonce copied from the neighbor solicitation message 18. In some examples, server 11A load balances the neighbor advertisement message 19 on the Ethernet segment (208), which results in leaf device 10B of Ethernet segment 16 receiving the neighbor advertisement message 19 including the nonce originated by leaf device 10A (210). In accordance with the techniques described in this disclosure, leaf device 10B processes neighbor advertisement message 19 even though leaf device 10B did not originate the nonce. For example, leaf device 10B determines whether the nonce included in neighbor advertisement message 19 is originated by leaf device 10B (212). More specifically, leaf device 10B determines whether the nonce included in neighbor advertisement message 19 matches a nonce stored in leaf device 10B (if leaf device 10B originated the neighbor solicitation message). In this example, since leaf device 10B did not originate the nonce and thus does not store a nonce, leaf device 10B determines that the nonce included in neighbor advertisement message 19 does not match a nonce stored in leaf device 10B (212).

Rather than drop neighbor advertisement message 19, leaf device 10B relaxes the nonce validation requirement. For example, in response to determining that the nonce is not originated by leaf device 10B, leaf device 10B determines whether neighbor advertisement message 19 was received on an ESI interface for Ethernet segment 16 (214). For example, leaf device 10B determines whether leaf device 10B belongs to an ESI (e.g., by advertising Ethernet Segment routes (Type 4)) of Ethernet segment 16 connecting leaf devices 10A and 10B. Leaf device 10B may determine that neighbor advertisement message 19 was received on an ESI interface for Ethernet segment 16, and drops the nonce from neighbor advertisement message 19 to learn a link layer address from neighbor advertisement message 19 (216).

Figure 3:
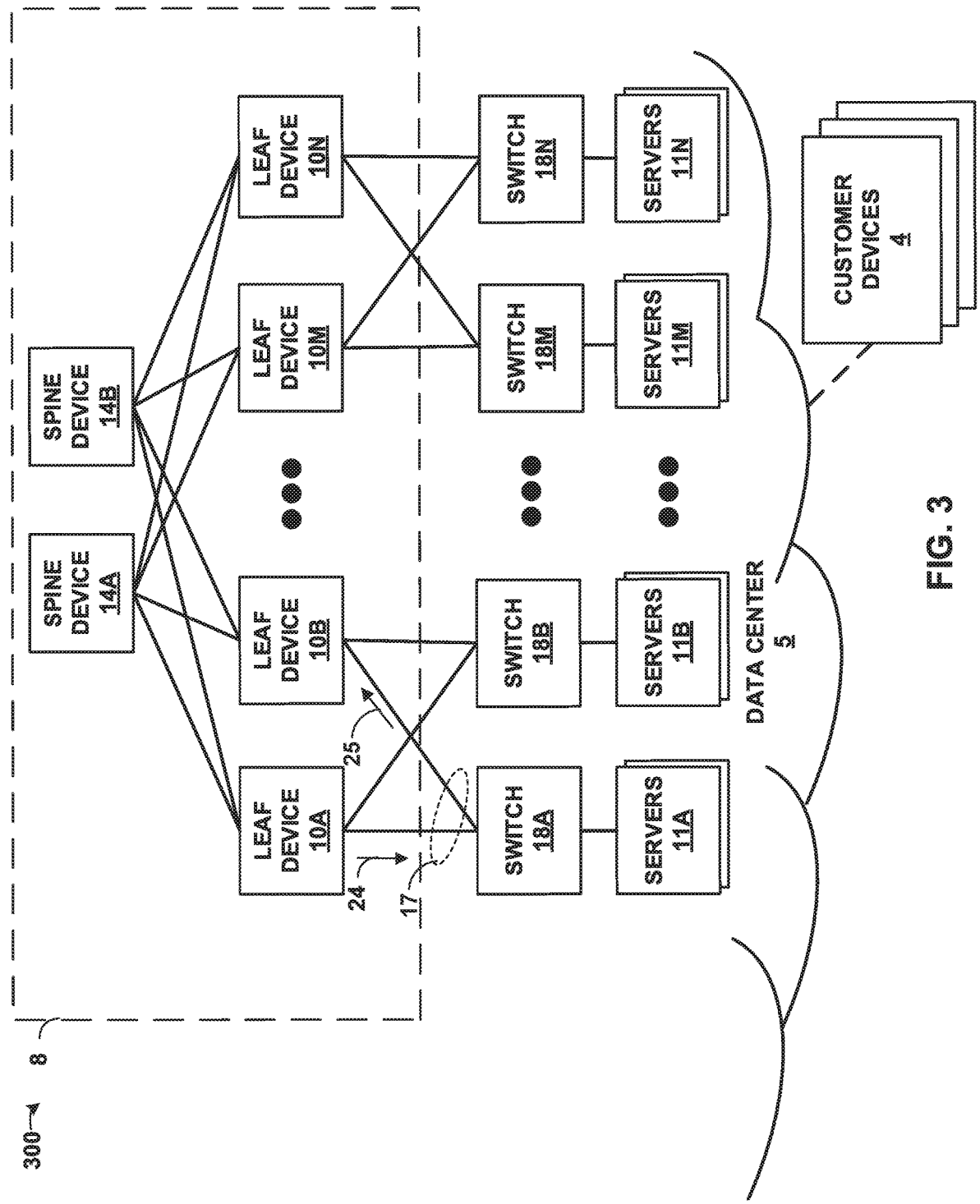
FIG. 3 is a block diagram illustrating another example network system configured to provide security extensions, e.g., SEND, to neighbor discovery in EVPN for a non-collapsed IP fabric, in accordance with one or more aspects of the techniques described in this disclosure.

FIG. 3 is a block diagram illustrating another example network system 300 configured to provide security extensions, e.g., SEND, to neighbor discovery in EVPN for a non-collapsed IP fabric, in accordance with one or more aspects of the techniques described in this disclosure. In the example of FIG. 3, the physical underlay network over which EVPN-VXLAN is deployed is a two-layer IP fabric, which may include spine devices 14 and leaf devices 10. Spine devices 14 provide connectivity between leaf devices 10, and leaf devices 10 provide connectivity to attached hosts, e.g., servers 11. In the overlay network, leaf devices 10 function as L2 gateways that handle traffic within a VXLAN, and spine devices 14 function as L3 gateways that handle traffic between VXLANs through the use of Integrated Routing and Bridging (IRB). In the example of FIG. 3, servers 11 access data center 5 via intermediate switches 18A-18N. In the example of FIG. 3, intermediate switch 18A is multi-homed to leaf devices 10 by Ethernet segment 17. In this example, IP fabric 8 is referred to as a "non-collapsed IP fabric."

In some examples, network devices, such as leaf devices 10 and servers 11, exchange neighbor discovery messages via intermediate switches 18. In this example, intermediate device 18A is multi-homed to leaf devices 10A and 10B, each functioning as an L3 gateway in a non-collapsed IP fabric as described above. In these examples, the sender device, leaf device 10A, may send a neighbor discovery request message, e.g., neighbor solicitation message 24, including a nonce to intermediate switch 18A, which switches the neighbor solicitation message 24 to server 11A. Server 11A responds to the neighbor solicitation message 24 with a neighbor discovery response message, e.g., neighbor advertisement message 25, including the nonce from neighbor solicitation message 24. Server 11A may send the neighbor advertisement message 25 to intermediate switch 18A, which load balances the neighbor advertisement message 25 on any of the links of Ethernet segment 17, and in some instances, send neighbor advertisement message 25 to leaf device 10B. That is, in the case of network devices configured in a multi-homed Ethernet segment, there may in some instances be an asymmetric request and response path where the sender device of the Ethernet segment sends the neighbor solicitation message including a nonce and the other network device of the Ethernet segment receives a neighbor advertisement message including the nonce originated by the sender device.

In these examples in which network devices exchange neighbor discovery messages in a non-collapsed IP fabric via an intermediate switch, the network devices are unable to relax the nonce validation requirement (e.g., as described in the example of FIG. 1) because an attacker may learn the source address of the sender device and use the source address to perform a replay attack on the network device that receives the neighbor advertisement message (e.g., leaf device 10B). For example, without the techniques described in this disclosure, a sender device typically sends a neighbor solicitation message with a source address of an address assigned to an interface from which the neighbor solicitation message is sent. In the example in which a sender device implements an IRB interface, the sender device sends a neighbor solicitation message including a source address that specifies the address assigned to the IRB interface (e.g., a virtual or anycast IP address). However, in a non-collapsed IP fabric such as in the example shown in FIG. 3, an attacker may learn the virtual IP address of the IRB interface of the sender device and may use the virtual IP address to perform a replay attack on the network device that receives the neighbor advertisement message (e.g., leaf device 10B).

In accordance with the techniques described in this disclosure, the devices of network system 300 may send a neighbor discovery request message, e.g., neighbor solicitation message, including a nonce and a source address that specifies a physical IP address of the sender device to cause the neighbor advertisement message to be forwarded to the sender device that originated the nonce.

As described above, devices of network system 300 are arranged in a non-collapsed IP fabric. In a non-collapsed IP fabric, a sender device, e.g., leaf device 10A, may send a neighbor discovery request message, e.g., neighbor solicitation message 24, including a nonce and a source address of the neighbor solicitation message specifying a physical IP address of leaf device 10A rather than the virtual IP address of the IRB interface.

In the example of FIG. 3, leaf device 10A may send a neighbor solicitation message 24 including a nonce to request the link layer address of a neighboring device, e.g., server 11A, and a source address of neighbor solicitation message 24 that specifies a physical IP address of leaf device 10A. In some examples, leaf device 10A may include an option to be configured to specify a physical IP address of the device as a source address of a neighbor solicitation message through a management interface (e.g., command-line interface (CLI)). In some examples, the configuration to specify the physical IP address as the source address may be "switched off" via configuration changes through the management interface, and use the virtual IP address of the IRB interface.

Intermediate switch 18A receives the neighbor solicitation message 24 and switches the neighbor solicitation message 24 to server 11A. Server 11A receives the neighbor solicitation message 24 and responds with a neighbor discovery response message, e.g., neighbor advertisement message 25, including the nonce from the neighbor solicitation message 24, and a destination address of neighbor advertisement message 25 that specifies the physical IP address of leaf device 10A. Server 11A may send neighbor advertisement message 25 to intermediate switch 18A, which load balances the neighbor advertisement message 25 on any of the links of Ethernet segment 17, and in some instances, send the neighbor advertisement message 25 to leaf device 10B. Leaf device 10B receives neighbor advertisement message 25 including the nonce originated by leaf device 10A, and in this example, leaf device 10B may determine that the destination address specifies the physical IP address of leaf device 10A, which causes leaf device 10B to send the neighbor solicitation message 25 over the overlay network, e.g., VXLAN, toward leaf device 10A. In this way, by specifying the physical IP address of leaf device 10A as the source address of neighbor solicitation message 24, server 11A may specify the physical IP address of leaf device 10A as the destination address of neighbor advertisement message 25 to cause a network device receiving neighbor advertisement message 25 to be forwarded to leaf device 10A that originated the nonce.

The example described in FIG. 3 is also applicable to a collapsed IP fabric, as described in the example of FIG. 1. That is, in either a collapsed or non-collapsed IP fabric, the sender device, e.g., leaf device 10A, may a send neighbor solicitation message including a nonce, where the neighbor solicitation message includes a source address specifying a physical IP address of leaf device 10A, to cause the neighbor advertisement message to be forwarded to the sender device that originated the nonce.

Figure 4:
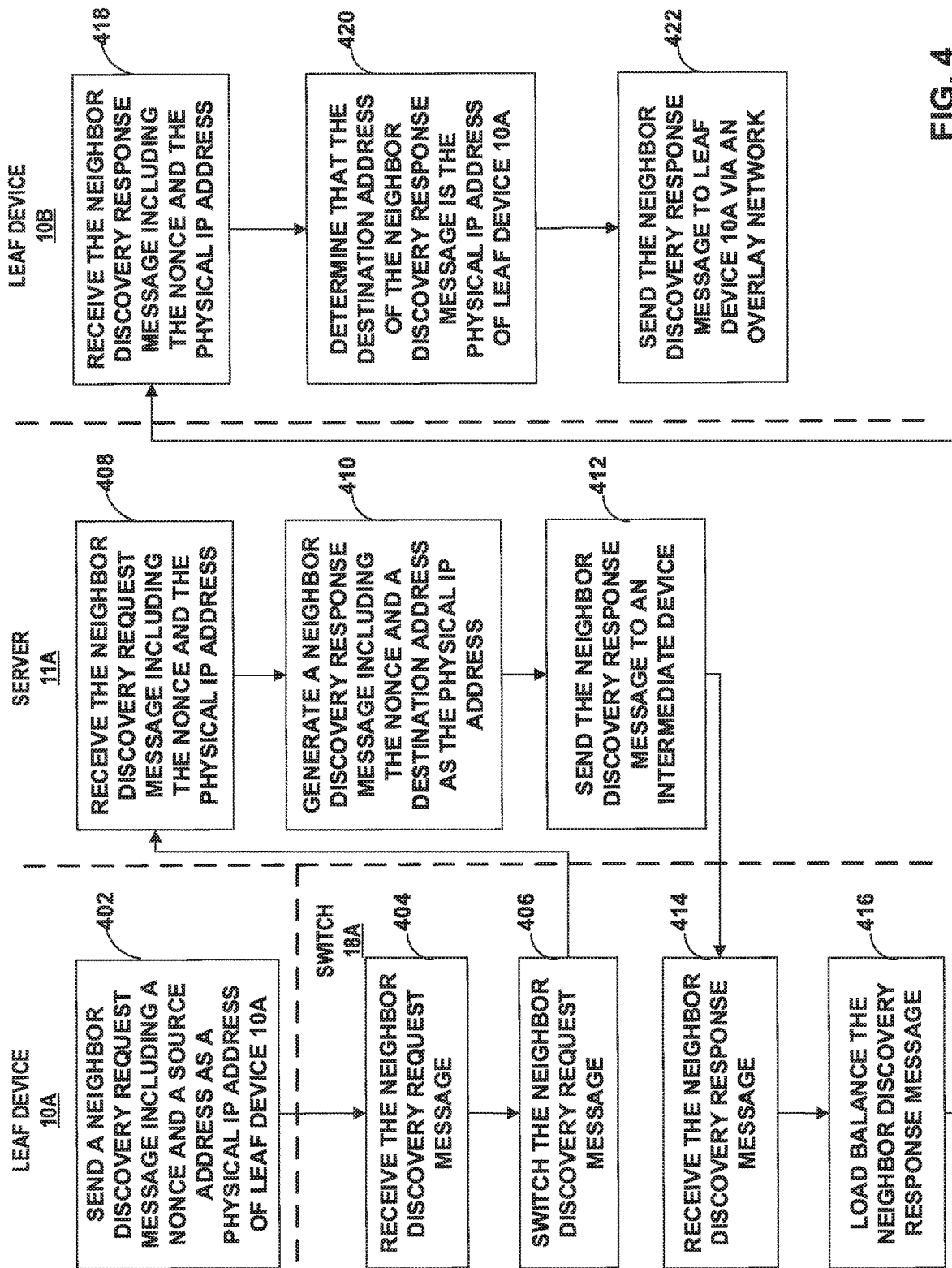
FIG. 4 is a flowchart illustrating an example operation of the network system in FIG. 3 configured to provide security extensions, e.g., SEND, to neighbor discovery in EVPN for a non-collapsed IP fabric, in accordance with one or more aspects of the techniques described in this disclosure.

FIG. 4 is a flowchart illustrating an example operation of the network system 300 in FIG. 3 configured to provide security extensions, e.g., SEND, to neighbor discovery in EVPN in a non-collapsed IP fabric, in accordance with one or more aspects of the techniques described in this disclosure. As described above, devices of network system 300 are arranged in a non-collapsed IP fabric.

In the example of FIG. 4, leaf device 10A may send a neighbor discovery request message, e.g., neighbor solicitation message 24, including a nonce and a source address of neighbor solicitation message 24 that specifies a physical IP address of leaf device 10A (402). For example, rather than specifying a source address of the neighbor solicitation message as the address assigned to the IRB interface (e.g., a virtual or anycast IP address), leaf device 10A specifies the source address of neighbor solicitation message 24 as the physical IP address of leaf device 10A.

An intermediate device, e.g., intermediate switch 18A, receives the neighbor solicitation message 24 (404) and switches the neighbor solicitation message 24 to server 11A (406). Server 11A receives the neighbor solicitation message 24 (408) and generates a neighbor discovery response message, e.g., neighbor advertisement message 25, including the nonce and a destination address of neighbor advertisement message 25 specifying the physical IP address of leaf device 10A (410). For example, server 11A responds with neighbor advertisement message 25 including the nonce copied from neighbor solicitation message 24. Server 11A also uses the physical IP address of leaf device 10A that is specified in the source address of neighbor solicitation message 24 as the destination address of neighbor advertisement message 25.

Server 11A sends neighbor advertisement message 25 to intermediate switch 18A (412). Intermediate switch 18A receives neighbor advertisement message 25 (414) and load balances neighbor advertisement message 25 on the links of Ethernet segment 17, and in some instances, sends neighbor advertisement message 25 to leaf device 10B (416).

Leaf device 10B receives neighbor advertisement message 25 including the nonce originated by leaf device 10A (418), and in this example, leaf device 10B processes neighbor advertisement message 25 even though leaf device 10B did not originate the nonce. For example, leaf device 10B determines that the destination address of neighbor advertisement message 25 specifies the physical IP address of leaf device 10A (420), which causes leaf device 10B to send neighbor solicitation message 25 over the overlay network, e.g., VXLAN, toward leaf device 10A (422).

Figure 5:
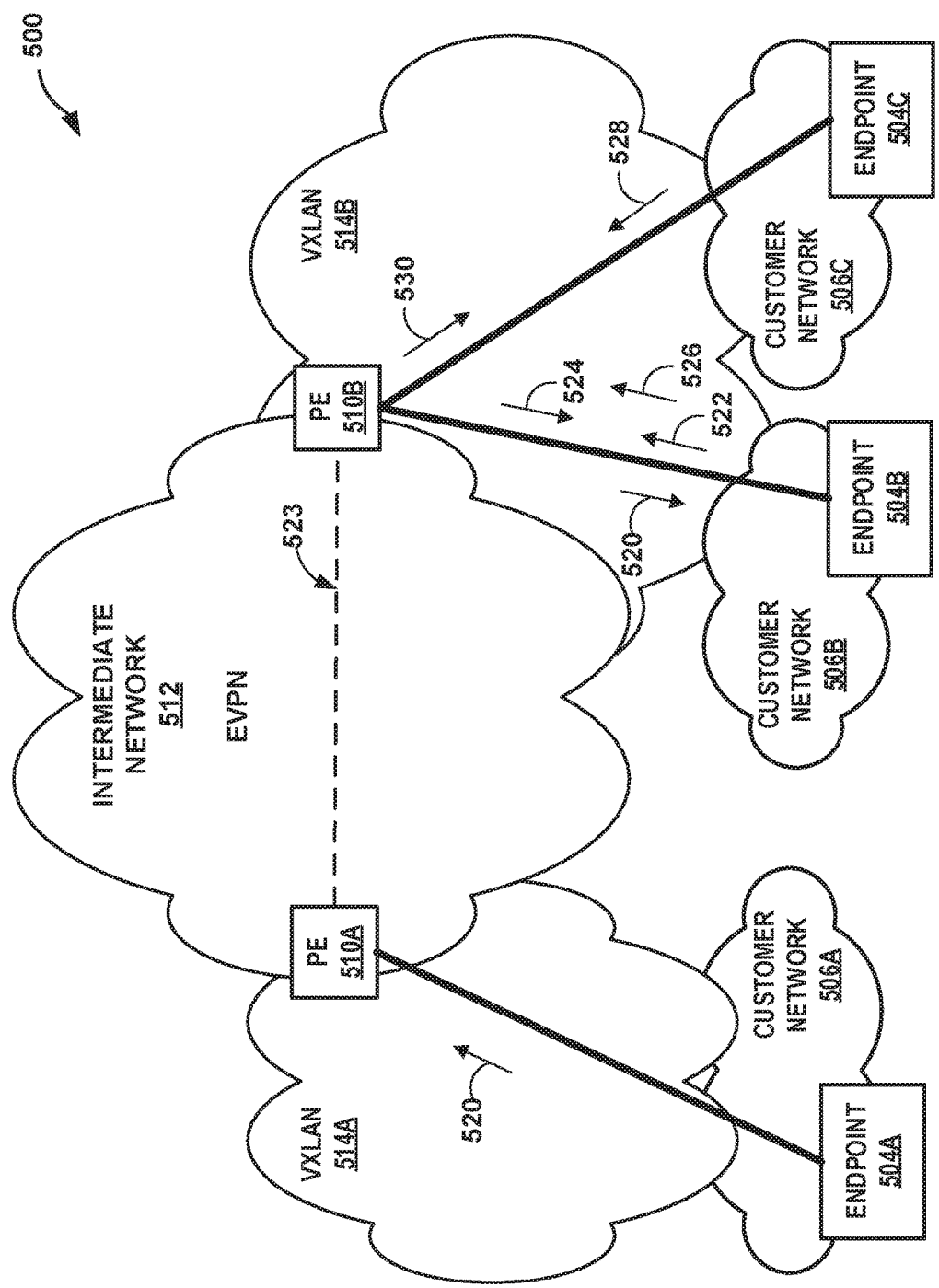
FIG. 5 is a block diagram illustrating another example network system 500 configured to provide security extensions, e.g., SEND, to a neighbor discovery protocol in EVPN for a network device operating as a proxy for neighbor discovery, in accordance with one or more aspects of the techniques described in this disclosure.

FIG. 5 is a block diagram illustrating another example network system 500 configured to provide security extensions, e.g., SEND, to a neighbor discovery protocol in EVPN for a network device operating as a proxy for neighbor discovery, in accordance with one or more aspects of the techniques described in this disclosure.

In the example of FIG. 5, network system 500 includes intermediate network 512 to interconnect a plurality of edge networks, e.g., customer networks 506A-506C (collectively, "customer networks 506"). Intermediate network 512 is a Layer 3 network that natively supports L3 operations including those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, intermediate network 512 may be referred to herein as a Service Provider ("SP") network or, alternatively, as a "core network" considering that intermediate network 512 acts as a core to interconnect edge networks, such as customer networks 506. Intermediate network 12 represents an L2/L3 switch fabric for one or more customer networks that may implement an EVPN service. As described above, EVPN is a service that provides a form of L2 connectivity across an intermediate L3 network, such as intermediate network 512, to interconnect two or more L2 customer networks, such as L2 customer networks 6, that may be located in different geographical areas (in the case of service provider network implementation) and/or in different racks (in the case of a data center implementation).

Customer networks 506 have customer endpoints 504A-504C (collectively, "endpoints 504"), respectively, that provide computing environments for subscribers/customers. Each of endpoints 504 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Endpoints 504 may access intermediate network 512 via one or more provider edge (PE) devices 510A and 510B (collectively, "PE devices 510"). PE devices 510 may each represent a router, switch, or other suitable network device that participates in an L2VPN service, such as an EVPN. As described above, EVPN is a service that provides a form of L2 connectivity across an intermediate L3 network, e.g., intermediate network 512, to interconnect two L2 customer networks, such as L2 customer networks 506, that are usually located in two different geographic areas. In the example of FIG. 5, intermediate network 512 may be referred to as an "EVPN core."

In the example of FIG. 5, PE devices 510 may operate as a proxy for neighbor discovery to reduce the flooding of neighbor discovery messages over an EVPN core (referred to herein as "EVPN-proxy"). For example, endpoints 504 may send neighbor discovery messages via PE devices 510. In this example, endpoint 504A may send a neighbor solicitation message including a link layer address of endpoint 504A to PE device 510A, which sends the neighbor solicitation message over the EVPN core, e.g., intermediate network 512, to PE device 510B, which in turn sends the neighbor solicitation message to a local host, e.g., endpoint 504B. In response, endpoint 504B sends a neighbor advertisement message including a local link layer address and is destined for endpoint 504A. By implementing EVPN-proxy, PE device 510B may intercept (i.e., "snoop") the neighbor advertisement message from endpoint 504B to learn the local link layer address of endpoint 504B, store the link layer address of endpoint 504B (e.g., in a proxy table), and advertise the locally learned link layer address using MAC/IP Advertisement route (Type 2) over the EVPN core 512 to other PE devices. In these examples, PE device 510B may act as a proxy by using the learned link layer addresses to reply locally to neighbor discovery request messages, which reduces the flooding of neighbor discovery messages over the EVPN core. For instance, PE device 510B may receive a neighbor solicitation message from endpoint 504C to request a link layer address of endpoint 504A. Rather than send the neighbor solicitation message over the EVPN core 512, PE device 510B may send a neighbor advertisement message including the link layer addresses learned from the neighbor advertisement message sent by endpoint 504B to endpoint 504A. Additional examples of EVPN-Proxy are described in J. Rabadan, ed., et al., "Operational Aspects of Proxy-ARP/ND in EVPN Networks," draft-ietf-bess-evpn-proxy-arp-nd-05, Internet Draft, Nov. 5, 2018, the entire contents of which is incorporated by reference herein.

In some examples, endpoints 504 may send neighbor discovery messages including a nonce. Ordinarily, without the techniques described in this disclosure, PE devices 510 are unable to snoop neighbor advertisement messages because the PE devices 510 do not originate the nonce and discard the neighbor advertisement messages (and are therefore unable to learn the link layer addresses of local and remote host devices). Without snooping the neighbor advertisement messages, the PE devices are unable to learn local link layer addresses and cannot advertise locally learned link layer addresses to remote PE devices.

In accordance with the techniques described in this disclosure, PE devices 510 implementing EVPN-proxy may provide security extensions, e.g., SEND, to neighbor discovery, in EVPN. In the example of FIG. 5, endpoint 504A may send a first neighbor discovery request message, e.g., neighbor solicitation message 520, including a nonce to PE device 510A, which sends neighbor solicitation message 520 over the EVPN core, e.g., intermediate network 512, to PE device 510B. PE device 510B sends neighbor solicitation message 520 to a local target destination device, e.g., endpoint 504B. In response, endpoint 504B sends a first neighbor discovery response message, e.g., neighbor advertisement message 522, including the nonce and local link layer addresses of endpoints 504A and 504B.

PE device 510B intercepts neighbor advertisement message 522 and determines whether PE device 510B originated the nonce. In this example, PE device 510B determines that neighbor advertisement message 522 includes a nonce that is not stored in PE device 510B. In response, PE device 510B drops neighbor advertisement message 522, and sends a new neighbor discovery request message, e.g., neighbor solicitation message 524, including the nonce, to endpoint 504B. Endpoint 504B receives the new neighbor solicitation message 524 and responds with a second neighbor discovery response message, e.g., neighbor advertisement message 526, including the nonce. PE device 510B receives neighbor advertisement message 526, determines that neighbor advertisement message 526 includes the nonce, and stores the learned link layer addresses (e.g., for endpoints 504A and 504B) in a proxy table. PE device 510B advertises (e.g., using MAC/IP Advertisement route (Type 2)) the learned link layer addresses for endpoint 504B over the EVPN core 512 to remote PE devices, e.g., PE device 510A. In this way, PE device 510B may act as a proxy by using the learned link layer addresses to reply to local neighbor discovery request messages rather than sending the neighbor discovery messages over the EVPN core. For example, when endpoint 504C sends neighbor solicitation message 528 from endpoint 504C to request a link layer address of endpoint 504A, PE device 510B does not send neighbor solicitation message 528 over EVPN core 512, but instead replies locally to endpoint 504C by sending neighbor advertisement message 530 including the link layer addresses learned from neighbor advertisement message 526, which reduces the flooding of neighbor discovery messages over the EVPN core.

In some examples, PE device 510B may include an option to be configured to operate as an EVPN-proxy for Neighbor Discovery messages through a management interface (e.g., command-line interface (CLI)). In some examples, the configuration to operate as an EVPN-proxy for Neighbor Discovery messages may be "switched off" via configuration changes through the management interface.

Figure 6:
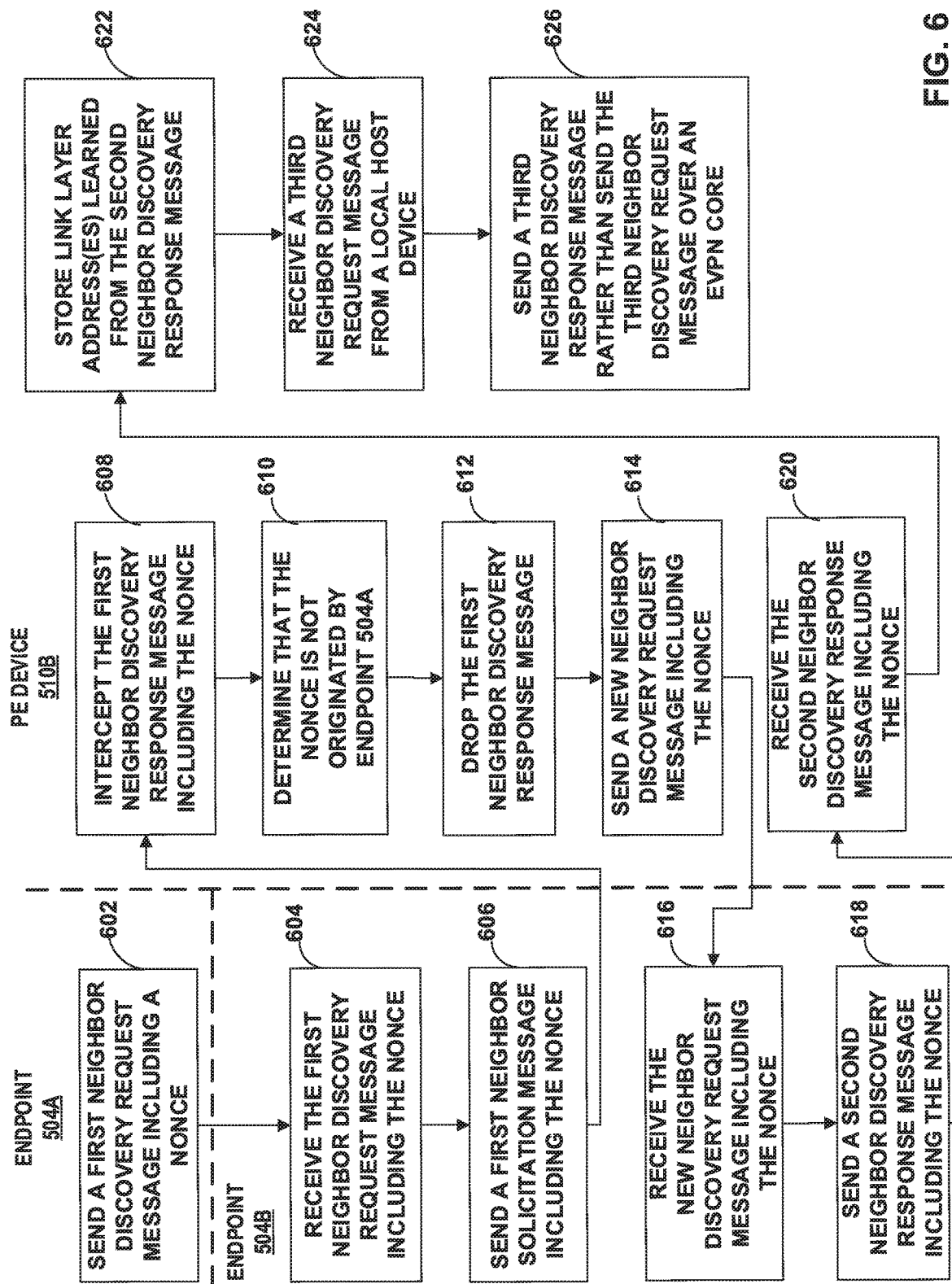
FIG. 6 is a flowchart illustrating an example operation of the network system in FIG. 5 configured to provide security extensions, e.g., SEND, to neighbor discovery in EVPN for a network device operating as a proxy for neighbor discovery, in accordance with one or more aspects of the techniques described in this disclosure.

FIG. 6 is a flowchart illustrating an example operation of the network system 500 in FIG. 5 configured to provide security extensions, e.g., SEND, to a neighbor discovery protocol in EVPN for a network device operating as a proxy for neighbor discovery, in accordance with one or more aspects of the techniques described in this disclosure.

In the example of FIG. 6, a sender device, e.g., endpoint 504A, sends a first neighbor discovery request message, e.g., neighbor solicitation message 520, including a nonce (602). Endpoint 504A sends neighbor solicitation message 520 to PE device 510A, which sends neighbor solicitation message 520 over the EVPN core 512 to PE device 510B. PE device 510B then sends the neighbor solicitation message 520 to the target destination device, e.g., endpoint 504B. Endpoint 504B receives the neighbor solicitation message 520 (604) and sends a first neighbor discovery response message, e.g., neighbor advertisement message 522, including the nonce originated by endpoint 504A (606). For example, in response to receiving neighbor solicitation message 520, endpoint 504B generates neighbor advertisement message 522 including the nonce copied from neighbor solicitation message 520 and destined for endpoint 504A.

PE device 510B may intercept the first neighbor discovery response message, e.g., neighbor advertisement message 522 (608). PE device 510B processes neighbor advertisement message 522 even though PE device 510B did not originate the nonce. For example, PE device 510B determines whether the nonce included in neighbor advertisement message 522 intercepted from endpoint 504B is originated by endpoint 504A (610). More specifically, PE device 10B determines whether the nonce included in the neighbor advertisement message 522 matches a nonce stored in PE device 510B. In this example, since PE device 510B does not store the nonce, PE device 510B determines that the nonce included in neighbor advertisement message 522 does not match a nonce stored in PE device 510B.

PE device 510B drops the first neighbor advertisement message 522 (612) and sends a new neighbor discovery request message, e.g., neighbor solicitation message 524, including the nonce (614). Endpoint 504B receives the new neighbor solicitation message 524 including the nonce (616). In response, endpoint 504B sends a second neighbor discovery response message, e.g., neighbor advertisement message 526, including the nonce (618). PE device 510B receives the neighbor advertisement message 526 including the nonce (620). In response to determining that the nonce in neighbor advertisement message 526 matches the nonce in the neighbor solicitation message 524, PE device 510B stores one or more link layer addresses learned from neighbor advertisement message 526 (622). In this way, when PE device 10B receives a third neighbor discovery request message, e.g., neighbor solicitation message 528, from a local host device, e.g., endpoint 504C, PE device 510B may act as a proxy by using the learned link layer addresses to reply locally to endpoint 504C (e.g., neighbor advertisement message 530) to reduce the flooding of neighbor discovery messages over an EVPN core, i.e., by not sending neighbor solicitation message 528 over an EVPN core (624).

Figure 7:
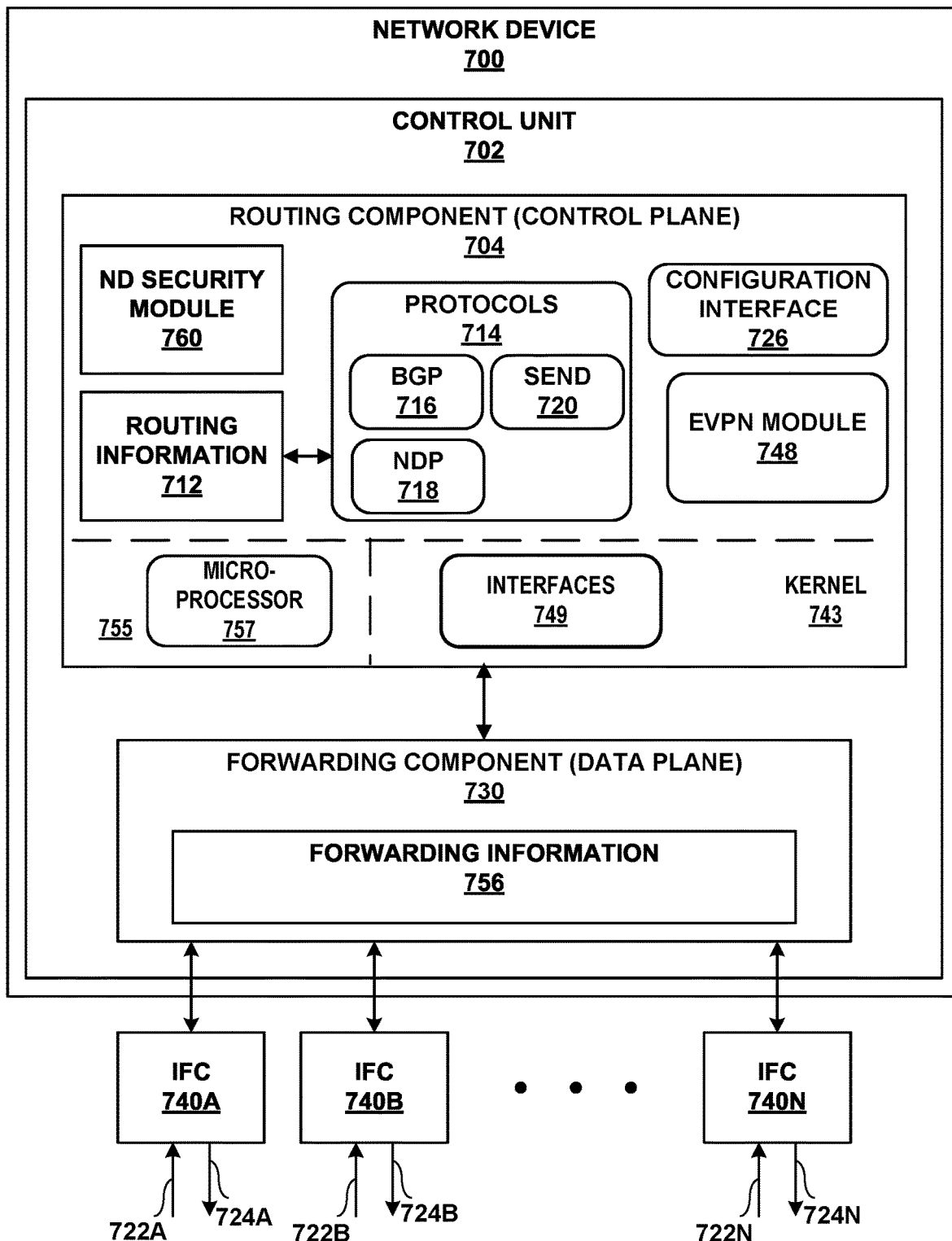
FIG. 7 is a block diagram illustrating an example of a network device, in accordance to one or more aspects of the techniques described herein.

FIG. 7 is a block diagram illustrating an example network device configured to provide SEcure Neighbor Discovery (SEND) in EVPN, in accordance with one or more aspects of the techniques described in this disclosure. Network device 700 is described with respect to any of leaf devices 10 of FIGS. 1 and 3, and PE devices 510 of FIG. 5, but may be performed by any of the devices of FIGS. 1, 3, and 5.

As shown in FIG. 7, network device 700 includes a control unit 702 having a routing component 704 (control plane), and control unit 702 that is coupled to forwarding component 730 (data plane). Forwarding component 730 is associated with one or more interface cards 740A-740N ("IFCs 740") that receive packets via inbound links 742A-742N ("inbound links 742") and send packets via outbound links 744A-744N ("outbound links 744"). IFCs 740 are typically coupled to links 742, 744 via a number of interface ports (not shown). Inbound links 742 and outbound links 744 may represent physical interfaces, logical interfaces, or some combination thereof.

Elements of control unit 702 and forwarding unit 730 may be implemented solely in software, or hardware, or may be implemented as combinations of software, hardware, or firmware. For example, control unit 702 may include one or more processors, one or more microprocessors, digital signal processors ("DSPs"), application specific integrated circuits ("ASICs"), field programmable gate arrays ("FPGAs"), or any other equivalent integrated or discrete logic circuitry, or any combination thereof, which execute software instructions. In that case, the various software modules of control unit 702 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory ("RAM"), read only memory ("ROM"), programmable read only memory (PROM), erasable programmable read only memory ("EPROM"), electronically erasable programmable read only memory ("EEPROM"), non-volatile random access memory ("NVRAM"), flash memory, a hard disk, a CD-ROM, a floppy disk, a cassette, a solid state drive, magnetic media, optical media, or other computer-readable media. Computer-readable media may be encoded with instructions corresponding to various aspects of network device 700, e.g., protocols, processes, and modules. Control unit 702, in some examples, retrieves and executes the instructions from memory for these aspects.

Routing component 704 includes kernel 743, which provides a run-time operating environment for user-level processes. Kernel 743 may represent, for example, a UNIX operating system derivative such as Linux or Berkeley Software Distribution (BSD). Kernel 743 offers libraries and drivers by which user-level processes may interact with the underlying system. Hardware environment 755 of routing component 704 includes microprocessor 757 that executes program instructions loaded into a main memory (not shown in FIG. 7) from a storage device (also not shown in FIG. 7) in order to execute the software stack, including both kernel 743 and processes executing on the operating environment provided by kernel 743. Microprocessor 757 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 743 provides an operating environment that executes various protocols 714 at different layers of a network stack, including protocols for implementing Ethernet Virtual Private Networks. For example, routing component 704 includes network protocols that operate at a network layer of the network stack. In the example of FIG. 7, network protocols include the Border Gateway Protocol (BGP) 716, which is a routing protocol. In particular, network device 700 may use a BGP route advertisement message to announce reachability information for the EVPN, where the BGP route advertisement specifies one or more MAC addresses learned by network device 700 instead of L3 routing information. Network device 700 updates routing information 712 based on the BGP route advertisement message. Network protocols 714 also includes Neighbor Discovery Protocol 718.

Network device 700 may use NDP 718 to send and receive neighbor discovery messages including router solicitation messages, router advertisement messages, neighbor solicitation messages, neighbor advertisement messages, and redirect messages. Network device 700 may use SEcure Neighbor Discovery (SEND) 720 to provide security extensions for NDP 718. Network device 700 may use SEND 720 to provide cryptographic mechanisms for network device 700 to secure delivery and authentication of neighbor discovery messages. For example, network device 700 may include a nonce with neighbor discovery messages to prevent replay attacks.

Routing component 704 may also include other protocols, such as an MPLS label distribution protocol and/or other MPLS protocols not shown in FIG. 7. Routing component 704 is responsible for the maintenance of routing information 712 to reflect the current topology of a network and other network entities to which network device 700 is connected. In particular, routing protocols periodically update routing information 712 to accurately reflect the topology of the network and other entities based on routing protocol messages received by network device 700.

Kernel 743 includes an interfaces table 749 ("interfaces 749") that represents a data structure that includes a corresponding entry for each logical interface configured for network device 700. Logical interfaces may correspond to local interfaces of network device 700 for Ethernet segments. Entries for respective logical interfaces may specify respective current information describing the logical interfaces.

Routing information 712 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing component 704 also includes an EVPN module 740 that performs L2 learning using BGP 716. EVPN module 740 may maintain tables for each EVI established by network device 700, or in alternative examples, may maintain one or more tables that are independent of each respective EVI. Network device 700 may use EVPN module 740 to advertise, e.g., EVPN routes, including Ethernet AD routes (Type 1) to advertise reachability of network device 700 for an Ethernet segment, Ethernet segment routes (Type 4) to discover other network devices of the Ethernet segment and for purposes of designated forwarder (DF) election (and backup DF election) for the Ethernet segment, and others. EVPN module 740 may store information from the EVPN routes, such as the identification of network devices of an Ethernet segment.

Forwarding component 730 represents hardware and logic functions that provide high-speed forwarding of network traffic. Forwarding component 730 typically includes a set of one or more forwarding chips programmed with forwarding information 756 that maps network destinations with specific next hops and the corresponding outbound interface ports. In general, when network device 700 receives a packet via one of inbound links 722, forwarding component 730 identifies an associated next hop for the data packet by traversing the programmed forwarding information 756 based on information within the packet. Forwarding component 730 forwards the packet on one of outbound links 724 mapped to the corresponding next hop. At this time, forwarding component 730 may push and/or pop labels from the packet to forward the packet along a correct label switched path. Forwarding information 756 may be maintained in the form of one or more tables, link lists, radix trees, databases, flat files, or any other data structures.

Routing component 704 also includes an EVPN module 220 that performs L2 learning using BGP 216. EVPN module 220 may maintain tables for each EVI established by PE device 200, or in alternative examples may maintain one or more tables that are independent of each respective EVI. PE device 200 may use EVPN module 748 to advertise, e.g., EVPN routes including Ethernet AD routes (Type 1) to advertise reachability of PE device 200 for an Ethernet segment, Ethernet segment routes (Type 4) to discover other PE devices of the Ethernet segment and for purposes of DF election (and backup DF election) for the Ethernet segment, and other EVPN routes. EVPN module 748 may store information from the routes, such as the identification of PE devices of an Ethernet segment.

Routing component 704 includes a configuration interface 726 that receives and may report configuration data for network device 700. Configuration interface 726 may represent a command line interface; a graphical user interface; Simple Network Management Protocol ("SNMP"), Netconf, or another configuration protocol; or some combination of the above in some examples. Configuration interface 726 receives configuration data configuring the network device 700, and other constructs that at least partially define the operations for network device 700, including the techniques described herein.

In accordance with the techniques described herein, routing component 704 may include a neighbor discovery security module 760 ("ND security module 760") that performs the techniques described in this disclosure. For example, ND security module 760 provides security extensions, e.g., SEND 720, to a neighbor discovery protocol, e.g., NDP 718, in EVPN. In the examples described below, a user or administrator may use configuration interface 726 to configure ND security module 760 to configure network device 700 to operate in provide security extensions, e.g., SEND, to neighbor discovery in EVPN, as described in this disclosure. For example, configuration interface 726 may include an option to configure network device 700 to relax the nonce validation requirement, to specify a physical IP address of network device 700 as a source address of a neighbor discovery message, and/or to operate as an EVPN-proxy for neighbor discovery, in accordance with the techniques described in this disclosure. In some examples, the configuration of network device 700 to provide security extensions to neighbor discovery in EVPN may be "switched off" via configuration changes through configuration interface 726.

In some examples in which network device 700 is multi-homed in a collapsed IP fabric (e.g., leaf device 10A in the example of FIG. 1), ND security module 760 is configured to determine whether a neighbor discovery response message, e.g., neighbor discovery advertisement message, includes a nonce originated by network device 700. For example, ND security module 760 may determine whether a nonce included in a neighbor discovery advertisement message matches a nonce stored in network device 700 (in memory not shown in FIG. 7). In response to determining that network device 700 did not originate the nonce, ND security module 760 may determine whether the neighbor discovery advertisement message was received on an interface of an Ethernet segment (e.g., Ethernet segment 16 of FIG. 1). For example, ND security module 760 may use EVPN module 748 to identify the leaf devices of the Ethernet segment (e.g., based on the advertised Ethernet segment routes (Type 4)). In response to determining that the neighbor discovery advertisement message was received on an interface of Ethernet segment 16, ND security module 760 may drop the nonce from the neighbor discovery advertisement message, learn the link layer addresses in neighbor discovery advertisement message, and store the learned addresses in routing information 712.

In some examples in which network device 700 is multi-homed in a non-collapsed IP fabric (e.g., leaf device 10A in the example of FIG. 3), ND security module 760 is configured to specify a source address of a neighbor discovery request message (e.g., neighbor discovery solicitation message) as a physical IP address. For example, network device 700 operates as a sender device and ND security module 760 may cause network device 700 to send a neighbor solicitation message including a nonce and a source address of the neighbor solicitation message specifying a physical IP address of network device 700 rather than a virtual IP address of an IRB interface.

In some examples in which network device 700 implements EVPN-proxy (e.g., PE device 510B of FIG. 5), ND security module 760 is configured to intercept a first neighbor discovery response message (e.g., neighbor advertisement message 522 of FIG. 5) from a local host device connected to network device 700 (e.g., endpoint 504B of FIG. 5), that was generated in response to the first neighbor request message (e.g., neighbor solicitation message 520 of FIG. 5) from a remote host device (e.g., endpoint 504A of FIG. 5). ND security module 760 determines whether the nonce included in neighbor advertisement message 522 intercepted from local host device endpoint 504B is not originated by network device 700. More specifically, ND security module 760 determines whether the nonce included in neighbor advertisement message 522 matches a nonce stored in network device 700. In this example, since network device 700 did not originate the nonce, ND security module 760 determines that the nonce included in neighbor advertisement message 522 does not match a nonce stored in network device 700.

ND security module 760 drops neighbor advertisement message 522 and sends a new neighbor discovery request message (e.g., neighbor solicitation message 524 of FIG. 5) including the nonce. The local host device, endpoint 504B, receives neighbor solicitation message 524 including the nonce, and in response, sends a second neighbor discovery response message (e.g., neighbor advertisement message 526 of FIG. 5) including the nonce. Network device 700 receives neighbor advertisement message 526 including the nonce. In response to determining that the nonce in neighbor advertisement message 526 matches the nonce in neighbor solicitation message 524, ND security module 760 causes network device 700 to store one or more link layer addresses learned from neighbor advertisement message 526. For example, ND security module 760 may store the locally learned addresses in routing information 712 (e.g., in a proxy table not shown in FIG. 7). ND security module 760 may also send MAC/IP Advertisement routes (Type 2) to remote PE devices (e.g., PE device 510A of FIG. 5) to advertise the locally learned link layer addresses. ND security module 760 may also receive MAC/IP Advertisement routes from remote PE devices to learn link layer addresses from remote host devices.

In this way, when network device 700 receives a third Neighbor Discovery request message (e.g., neighbor solicitation message 528 of FIG. 5) from a local host device (e.g., endpoint 504C of FIG. 5), network device 700 may act as a proxy by using the learned link layer addresses stored in routing information 712 to reply locally to endpoint 504C to reduce the flooding of neighbor discovery messages over an EVPN core.

In addition to or as an alternative to the above, the following examples are described. The features described in any of the following examples may be utilized with any of the other examples described herein.

Figure 8:
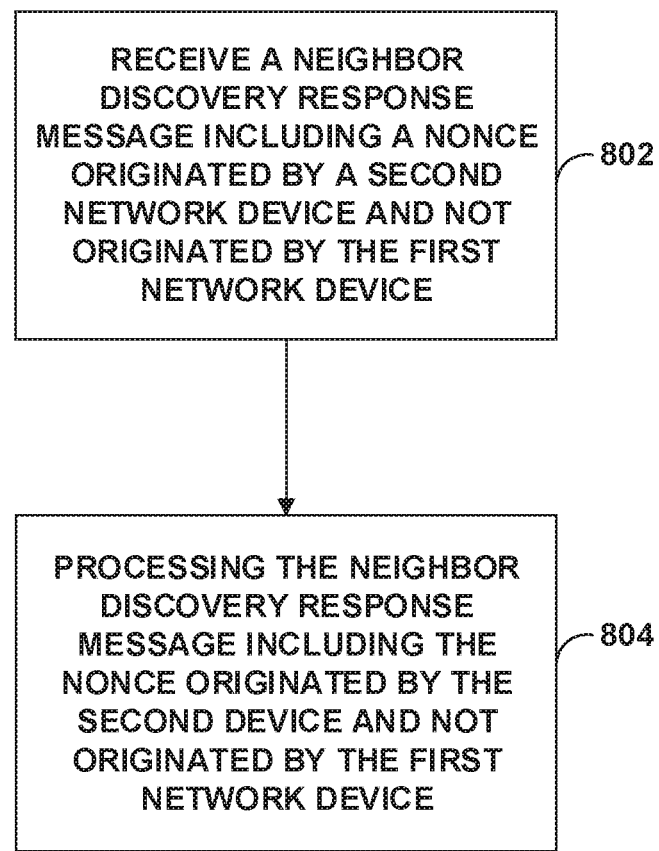
FIG. 8 is a flowchart illustrating an example operation of a network system configured to provide security extensions, e.g., SEND, to neighbor discovery in EVPN, in accordance with one or more aspects of the techniques described in this disclosure.

FIG. 8 is a flowchart illustrating an example operation of a network system configured to provide security extensions, e.g., SEND, to neighbor discovery in EVPN, in accordance with one or more aspects of the techniques described in this disclosure. FIG. 8 is described with respect to the examples described in FIGS. 1-6.

In the example of FIG. 8, a network device implementing EVPN receives a neighbor discovery response message including a nonce originated by a second network device and not originated by the first network device (802). As one example, each of spine devices 14 is communicatively coupled to each of leaf devices 10A-10N, and servers 11 are directly connected to leaf devices 10 that operate as both L2 and L3 gateways, and is thus arranged as a collapsed IP fabric (as shown in the example of FIG. 1). In these examples, the sender device, leaf device 10A, may send a neighbor discovery request message, e.g., neighbor solicitation message 24, including a nonce to server 11A. Server 11A responds to the neighbor solicitation message 24 with a neighbor discovery response message, e.g., neighbor advertisement message 25, including the nonce from neighbor solicitation message 24. In some instances, leaf device 10B may receive the neighbor advertisement message 25 including a nonce that leaf device 10B did not originate.

As another example, leaf devices 10A and 10B are in a non-collapsed IP fabric (as shown in the example of FIG. 3). In these examples, the sender device, leaf device 10A, may send a neighbor discovery request message, e.g., neighbor solicitation message 24, including a nonce to intermediate switch 18A, which switches the neighbor solicitation message 24 to server 11A. Server 11A responds to the neighbor solicitation message 24 with a neighbor discovery response message, e.g., neighbor advertisement message 25, including the nonce from neighbor solicitation message 24. Server 11A may send the neighbor advertisement message 25 to intermediate switch 18A, which load balances the neighbor advertisement message 25 on any of the links of Ethernet segment 17. In some instances, leaf device 10B receives the neighbor advertisement message 25 including a nonce that leaf device 10B did not originate.

In yet another example, in a network implementing EVPN-Proxy (as shown in the example of FIG. 5), PE device 510B may intercept neighbor advertisement message 522 from endpoint 504B to learn the local link layer address of endpoint 504B. In this example, PE device 510B intercepts neighbor advertisement message 522 that includes a nonce that is not originated by PE device 510B.

The first network device may process the neighbor discovery response message including the nonce originated by the second network device and not originated by the first network device (804). In a collapsed IP fabric example, the first network device (e.g., leaf device 10B) determines whether the first network device originated the nonce. In response to determining that the first network device did not originate the nonce, the first network device determines whether the neighbor discovery response message was received on an Ethernet segment identifier (ESI) interface of the Ethernet segment. In response to determining that the neighbor discovery response message was received on the ESI interface of the Ethernet segment, the first network device drops the nonce from the neighbor discovery response message to learn a link layer address from the neighbor discovery response message.

In a non-collapsed IP fabric example, the first network device (e.g., leaf device 10B) determines that a destination address of the neighbor discovery response message is a physical IP address of the second network device. In response to determining that the destination address of the neighbor discovery response message is the physical IP address of the second network device, the first network device sends the neighbor discovery response message to the second network device via an overlay network.

In an EVPN-Proxy example, the first network device intercepts, from a local host device, the first neighbor discovery response message including the nonce, wherein the first neighbor discovery response message is generated by the local host device in response to a first neighbor discovery request message and destined for a remote host device. The first network device determines whether the first network device originated the nonce. In response to determining that the first network device did not originate the nonce, the first network device drops the first neighbor discovery response message, sends a second neighbor discovery request message to the local host device, wherein the second neighbor discovery request message includes the nonce originated by the first network device, and stores the nonce. The first network device receives, from the local host device, a second neighbor discovery response message including the nonce; in response to determining that the nonce is stored in the first network device, and stores one or more link layer addresses learned from the second neighbor discovery response message.

Example 1. A method comprising: receiving, by a first network device that implements Ethernet Virtual Private Network (EVPN), a neighbor discovery response message including a nonce originated by a second network device and not originated by the first network device; and processing, by the first network device, the neighbor discovery response message including the nonce originated by the second network device and not originated by the first network device.

Example 2. The method of example 1, wherein the first network device and a second network device are coupled to a multi-homed host device by an Ethernet segment, wherein processing the neighbor discovery response message including the nonce originated by the second network device and not originated by the first network device further comprises: determining, by the first network device, whether the first network device originated the nonce; in response to determining that the first network device did not originate the nonce, determining, by the first network device, whether the neighbor discovery response message was received on an Ethernet segment identifier (ESI) interface of the Ethernet segment; and in response to determining that the neighbor discovery response message was received on the ESI interface of the Ethernet segment, dropping the nonce from the Neighbor Discovery response message to learn a link layer address from the neighbor discovery response message.

Example 3. The method of example 1, wherein the first network device and the second network device are coupled to a host device by a multi-homed intermediate network device by an Ethernet segment, wherein processing the neighbor discovery response message including the nonce originated by the second network device and not originated by the first network device further comprises: determining, by the first network device, that a destination address of the Neighbor Discovery response message is a physical IP address of the second network device; in response to determining that the destination address of the Neighbor Discovery response message is the physical IP address of the second network device, sending, by the first network device, the neighbor discovery response message to the second network device via an overlay network.

Example 4. The method of example 1, wherein the first network device is coupled to a local host device, wherein the neighbor discovery response message comprises a first neighbor discovery response message, wherein processing the first neighbor discovery response message including the nonce originated by the second network device and not originated by the first network device further comprises: intercepting, by the network device and from a local host device, the first neighbor discovery response message including the nonce, wherein the first neighbor discovery response message is generated by the local host device in response to a first neighbor discovery request message and destined for a remote host device; determining, by the first network device, whether the first network device originated the nonce; in response to determining that the first network device did not originate the nonce, dropping, by the first network device, the first neighbor discovery response message; sending, by the first network device, a second neighbor discovery request message to the local host device, wherein the second neighbor discovery request message includes the nonce originated by the first network device; storing, by the first network device, the nonce; receiving, by the first network device and from the local host device, a second neighbor discovery response message including the nonce; in response to determining that the nonce is stored in the first network device, storing, by the first network device, one or more link layer addresses learned from the second neighbor discovery response message.

Example 5. A method comprising: receiving, by a first network device that implements Ethernet Virtual Private Network (EVPN), a neighbor discovery response message including a nonce originated by a second network device, wherein the first network device and the second network device are coupled to a multi-homed host device by an Ethernet segment; determining, by the first network device, whether the first network device originated the nonce; in response to determining that the first network device did not originate the nonce, determining, by the first network device, that the neighbor discovery response message was received on an Ethernet segment identifier (ESI) of the Ethernet segment; in response to determining that the neighbor discovery response message was received on the ESI of the Ethernet segment, dropping by the first network device, the nonce of the neighbor discovery response message to learn a link layer address of the host device from the neighbor discovery response message.

Example 6. The method of example 5, wherein determining whether the first network device originated the nonce comprises: determining, by the first network device, whether the nonce of the neighbor discovery response message matches a nonce stored in the first network device.

Example 7. The method of example 6, wherein the neighbor discovery response message comprises a neighbor advertisement message configured using a Neighbor Discovery Protocol (NDP).

Example 8. The method of example 7, wherein the Neighbor Discovery Protocol is extended to include security extensions including SEcure Neighbor Discovery (SEND).

Example 9. The method of example 6, wherein the neighbor discovery response message is sent by the host device in response to a neighbor discovery request message sent by the second network device.

Example 10. The method of example 5, wherein the first network device and the second network device operate as both a layer 2 gateway and a layer 3 gateway.

Example 11. A method, comprising: receiving, by a first network device that implements Ethernet Virtual Private Network (EVPN), a neighbor discovery response message including a nonce, wherein a destination address of the neighbor discovery response message specifies a physical Internet Protocol (IP) address of a second network device, wherein the first network device and the second network device are coupled to a host device by a multi-homed intermediate network device by an Ethernet segment; determining, by the first network device, that a destination address of the neighbor discovery response message is the physical IP address of the second network device; and in response to determining that the destination address of the neighbor discovery response message is the physical IP address of the second network device, sending, by the first network device, the neighbor discovery response message to the second network device via an overlay network.

Example 12. The method of example 11, wherein the neighbor discovery response message comprises a neighbor advertisement message configured using a Neighbor Discovery Protocol (NDP).

Example 13. The method of example 12, wherein the Neighbor Discovery Protocol is extended to include security extensions including SEcure Neighbor Discovery (SEND).

Example 14. The method of example 11, wherein the neighbor discovery response message is sent by the host device in response to a neighbor discovery request message sent by the second network device.

Example 15. The method of example 11, wherein the first network device and second network device operate as a layer 3 gateway, and wherein the intermediate network device operates as a layer 2 gateway.

Example 16. A method, comprising: receiving, by a first network device that implements Ethernet Virtual Private Network (EVPN), a neighbor discovery response message including a nonce, wherein a destination address of the neighbor discovery response message specifies a physical Internet Protocol (IP) address of a second network device, wherein the first network device and the second network device are coupled to a multi-homed host device by an Ethernet segment; determining, by the first network device, that a destination address of the neighbor discovery response message is the physical IP address of the second network device; and in response to determining that the destination address of the neighbor discovery response message is the physical IP address of the second network device, sending, by the first network device, the neighbor discovery response message to the second network device via an overlay network.

Example 17. A method comprising, sending, by a first network device that implements Ethernet Virtual Private Network (EVPN), a neighbor discovery request message including a nonce, wherein a source address of the neighbor discovery request message specifies a physical Internet Protocol (IP) address of the first network device, wherein the first network device and a second network device are coupled to a host device by a multi-homed intermediate network device by an Ethernet segment; and receiving, by the first network device and from the second network device, a neighbor discovery response message including the nonce via a layer 2 overlay network.

Example 18. The method of example 17, wherein the neighbor discovery request message comprises a neighbor solicitation message configured using a Neighbor Discovery Protocol (NDP).

Example 19. The method of example 18, wherein the Neighbor Discovery Protocol is extended to include security extensions including SEcure Neighbor Discovery (SEND).

Example 20. A method comprising: intercepting, by a network device of a plurality of network devices that implement an Ethernet Virtual Private Network (EVPN), wherein the first neighbor discovery response message is originated by a local host device coupled to the network device and destined for a remote host device, wherein the first neighbor discovery response message is in response to a first neighbor discovery request message originated by the remote host device; determining, by the network device, whether the network device originated the nonce included in the first neighbor discovery response message; in response to determining that the network device did not originate the nonce, dropping, by the network device, the first neighbor discovery response message; sending, by the network device and to the local host device, a second neighbor discovery request message including the nonce; receiving, by the network device and from the local host device, a second neighbor discovery response message including the nonce; determining, by the network device, whether the network device originated the nonce included in the second neighbor discovery response message; and in response to determining that the network device originated the nonce included in the second neighbor discovery response message, storing, by the network device, one or more link layer addresses learned from the second neighbor discovery response message.

Example 21. The method of example 20, wherein the Neighbor Discovery request message comprises a neighbor solicitation message configured using a Neighbor Discovery Protocol (NDP), and wherein the neighbor discovery response message comprises a neighbor advertisement message configured using the NDP.

Example 22. The method of example 20, further comprising: receiving, by the network device, a third neighbor discovery request message from a local host and destined for a remote host device; and sending, by the network device and using the one or more link layer addresses stored in the network device, a third neighbor discovery response message rather than sending the third neighbor discovery request message over an EVPN core.

Example 23. The method of example 20, wherein determining that the network device did not originate the nonce comprises: determining, by the network device, that the nonce of the neighbor discovery response message does not match a nonce stored in the network device.

Example 24. A network device comprising: one or more processors coupled to a memory, wherein the one or more processors are configured to perform any of the methods recited in any of examples 1-23.

Example 25. A non-transitory computer-readable storage medium comprising instructions for causing one or more programmable processors to perform any of the methods recited in any of examples 1-23.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
   receiving, by a first network device that implements Ethernet Virtual Private Network (EVPN), a neighbor discovery response message including a nonce originated by a second network device, wherein the first network device and second network device are coupled to a host device by a multi-homed intermediate network device by an Ethernet segment;
   determining, by the first network device, whether the nonce of the neighbor discovery response message matches a nonce stored in the first network device; and
   in response to determining that the nonce of the neighbor discovery response message does not match a nonce stored in the first network device, determining, by the first network device, whether the neighbor discovery response message was received on an Ethernet segment identifier (ESI) interface of the Ethernet segment; and
   in response to determining that the neighbor discovery response message was received on the ESI interface of the Ethernet segment, dropping the nonce from the neighbor discovery response message to learn a link layer address from the neighbor discovery response message.

2. The method of claim 1, wherein the first network device and the second network device operate as both a layer 2 gateway and a layer 3 gateway.

3. The method of claim 1, wherein the neighbor discovery response message comprises a neighbor advertisement message configured using a Neighbor Discovery Protocol (NDP).

4. The method of claim 3, wherein the Neighbor Discovery Protocol is extended to include security extensions including SEcure Neighbor Discovery (SEND).

5. The method of claim 1, wherein the neighbor discovery response message comprises a first neighbor discovery response message including a first nonce originated by the second network device, further comprising:
   receiving, by the first network device, a second neighbor discovery response message including a second nonce originated by the second network device,
   determining, by the first network device, whether the second nonce of the second neighbor discovery response message matches a nonce stored in the first network device;
   in response to a determining that the second nonce of the second neighbor discovery message does not match the nonce stored in the first network device, determining that a destination address of the second neighbor discovery response message is a physical IP address of the second network device; and
   in response to determining that the destination address of the second neighbor discovery response message is the physical IP address of the second network device, sending, by the first network device, the second neighbor discovery response message to the second network device via an overlay network.

6. A first network device that implements Ethernet Virtual Private Network (EVPN), comprising:
   one or more processors coupled to a memory, wherein the one or more processors are configured to:
   receive a neighbor discovery response message including a nonce originated by a second network device, wherein the first network device and the second network device are coupled to a host device by a multi-homed intermediate network device by an Ethernet segment;
   determine whether the nonce of the neighbor discovery response message matches a nonce stored in the first network device; and
   in response to a determination that the nonce of the neighbor discovery message does not match a nonce stored in the first network device, determining that a destination address of the neighbor discovery response message is a physical IP address of the second network device; and
   in response to determining that the destination address of the neighbor discovery response message is the physical IP address of the second network device, sending, by the first network device, the neighbor discovery response message to the second network device via an overlay network.

7. The first network device of claim 6, wherein the neighbor discovery response message comprises a neighbor advertisement message configured using a Neighbor Discovery Protocol (NDP).

8. The first network device of claim 6, wherein the Neighbor Discovery Protocol is extended to include security extensions including SEcure Neighbor Discovery (SEND).

9. The first network device of claim 6,
wherein the first network device and the second network device operate as a layer 2 gateway.

10. A non-transitory computer-readable storage medium comprising instructions for causing one or more programmable processors of a first network device to:
intercept, from a local host device coupled to the first network device, a first neighbor discovery response message including a nonce, wherein the first neighbor discovery response message is generated by the local host device in response to a first neighbor discovery request message, wherein the first neighbor discovery response message is destined for a remote host device;
determine whether the nonce of the neighbor discovery response message matches a nonce stored in the first network device; and
in response to a determination that the nonce of the neighbor discovery response message does not match a nonce stored in the first network device, store the nonce;
drop the first neighbor discovery response message;
send a second neighbor discovery request message to the local host device, wherein the second neighbor discovery request message includes the nonce;
receive, from the local host device, a second neighbor discovery response message including the nonce; and
in response to determining that the nonce is stored in the first network device, store one or more link layer addresses learned from the second neighbor discovery response message.

11. The non-transitory computer-readable storage medium of claim 10, wherein the instructions further cause one or more programmable processors of the first network device to:
receive a third neighbor discovery request message from a second local host device and destined for the remote host device; and
send, by the first network device and using the one or more link layer addresses stored in the first network device, a third neighbor discovery response message rather than sending the third neighbor discovery request message over an EVPN core.

12. The non-transitory computer-readable storage medium of claim 10, wherein the first neighbor discovery response message comprises a neighbor advertisement message configured using a Neighbor Discovery Protocol (NDP).

13. The non-transitory computer-readable storage medium of claim 12, wherein the Neighbor Discovery Protocol is extended to include security extensions including SEcure Neighbor Discovery (SEND).

* * * * *